United States Patent
Keating

(10) Patent No.: US 8,636,129 B2
(45) Date of Patent: Jan. 28, 2014

(54) CORRUGATED STRIP FOR SPLINED CLUTCH HOUSING AND HUB

(75) Inventor: Martin P. Keating, Plainfield, IL (US)

(73) Assignee: BorgWarner Inc., Auburn Hills, MI (US)

( * ) Notice: Subject to any disclaimer, the term of this patent is extended or adjusted under 35 U.S.C. 154(b) by 265 days.

(21) Appl. No.: 13/030,257

(22) Filed: Feb. 18, 2011

(65) Prior Publication Data

US 2011/0203897 A1 Aug. 25, 2011

Related U.S. Application Data

(60) Provisional application No. 61/338,897, filed on Feb. 25, 2010.

(51) Int. Cl.
*F16D 13/62* (2006.01)

(52) U.S. Cl.
USPC .......................................... 192/112; 192/70.2

(58) Field of Classification Search
USPC ........... 29/893, 893.2, 893.3–893.34; 72/197, 72/379.6, 362.1; 192/70.2, 112
See application file for complete search history.

(56) References Cited

U.S. PATENT DOCUMENTS

| | | | | |
|---|---|---|---|---|
| 940,679 | A * | 11/1909 | Evans | 192/70.2 |
| 3,830,088 | A * | 8/1974 | Couper et al. | 72/196 |
| 4,077,107 | A * | 3/1978 | Reuter | 29/428 |
| 4,487,047 | A * | 12/1984 | Killop | 72/88 |
| 5,447,048 | A * | 9/1995 | Tanaka et al. | 72/315 |
| 7,028,403 | B2 * | 4/2006 | Takahashi et al. | 29/893.33 |
| 7,416,067 | B2 * | 8/2008 | Heinrich et al. | 192/70.2 |
| 2004/0060795 | A1 * | 4/2004 | Schmidt et al. | 192/70.2 |
| 2004/0084274 | A1 * | 5/2004 | Schreiber et al. | 192/70.2 |
| 2004/0134740 | A1 * | 7/2004 | Gerathewohl et al. | 192/70.2 |
| 2006/0049017 | A1 * | 3/2006 | Furuichi | 192/30 W |
| 2007/0084694 | A1 * | 4/2007 | Doherty et al. | 192/70.2 |
| 2008/0257678 | A1 * | 10/2008 | Ari | 192/112 |
| 2009/0127053 | A1 * | 5/2009 | Nosakowski et al. | 192/70.2 |

* cited by examiner

*Primary Examiner* — David D Le
*Assistant Examiner* — Huan Le
(74) *Attorney, Agent, or Firm* — Warn Partners, P.C.

(57) ABSTRACT

An automotive clutch housing and a method of manufacture thereof is provided. The clutch housing has a cylindrical body that is formed from a form folded strip metal sheet that is later formed into a cylindrical body. The cylindrical body is then joined to a hub to form a clutch housing.

3 Claims, 7 Drawing Sheets

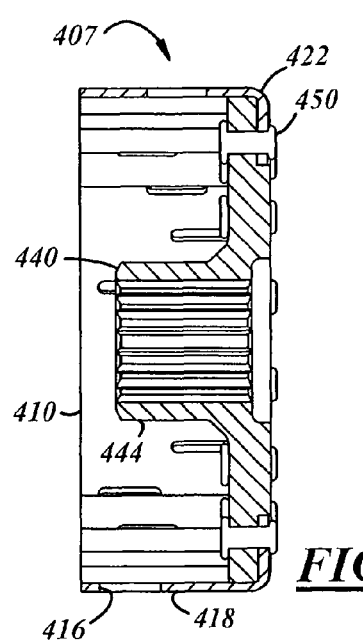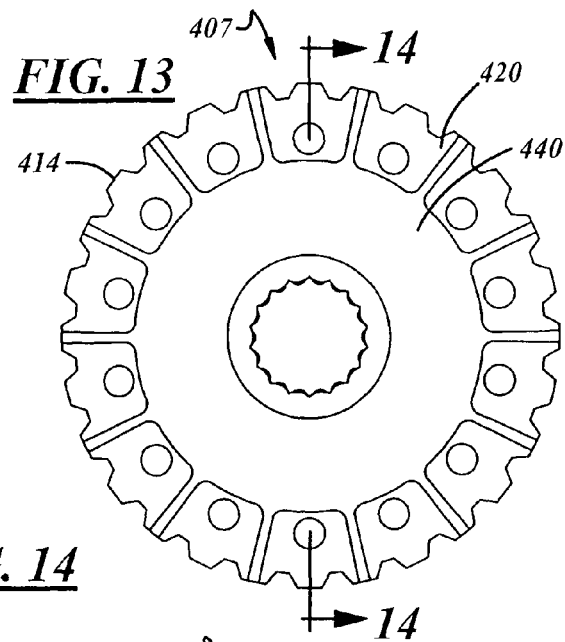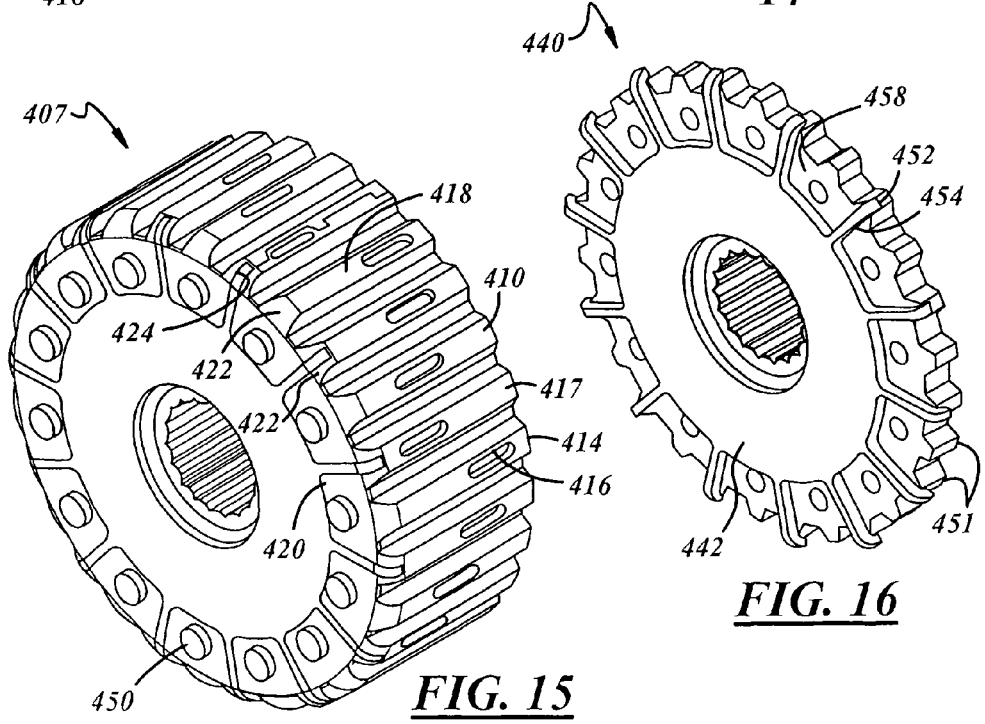

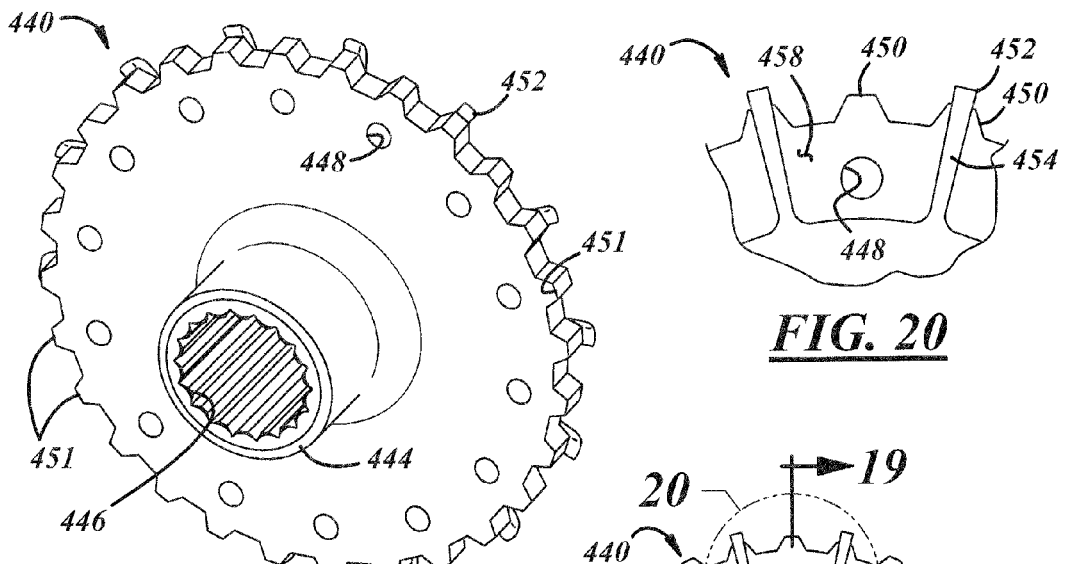
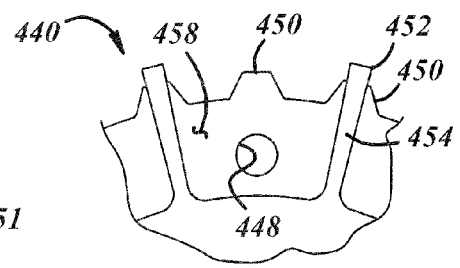
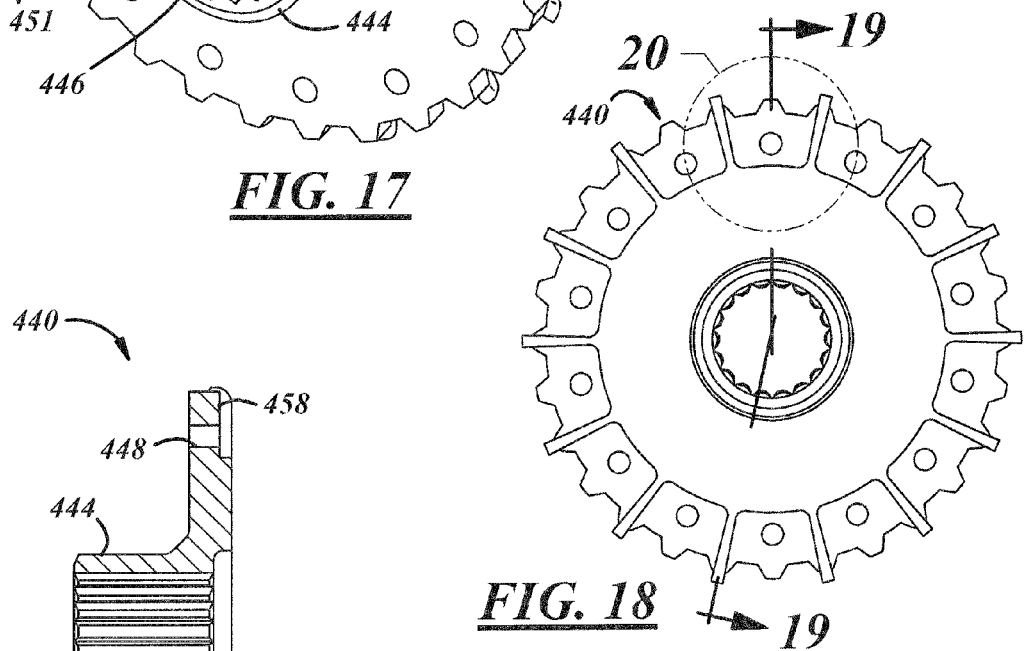
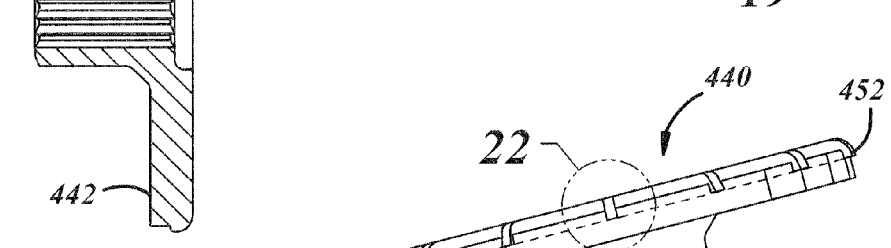
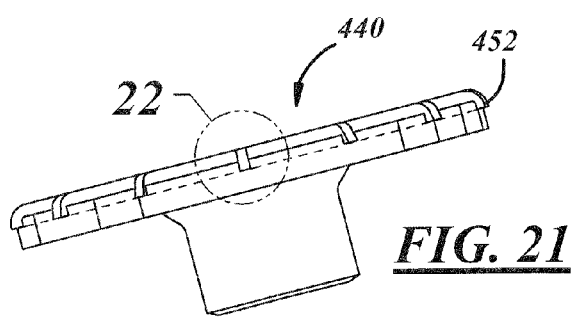
FIG. 17
FIG. 20
FIG. 18
FIG. 19
FIG. 21

CORRUGATED STRIP FOR SPLINED CLUTCH HOUSING AND HUB

CROSS-REFERENCE TO RELATED APPLICATIONS

This application claims priority to U.S. Provisional Application No. 61/338,897 filed Feb. 25, 2010.

FIELD OF THE INVENTION

The present invention relates to clutch housings for automotive transmissions in automotive vehicles such as, but not limited to, passenger vehicles, motor cycles, rough-terrain vehicles and trucks.

BACKGROUND OF THE INVENTION

Many, if not most, automotive clutch housings are fabricated from a cylindrical work piece. Spline teeth are then formed or cut into the cylindrical work piece. It is desirable to provide a clutch housing where the spline teeth of the clutch housing can be formed on a generally flat work piece that is later formed into a cylinder.

SUMMARY OF THE INVENTION

In a preferred embodiment, the present invention provides a clutch housing that is formed from a work piece of sheet strip material. The work piece has spline teeth fold formed thereon. The form folded work piece is then formed into a cylinder and is connected with a hub portion of a clutch housing.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 13 is a top view of a clutch housing of yet another alternate preferred embodiment of the present invention;

FIG. 14 is a sectional view taken along lines 14-14 of FIG. 3;

FIG. 15 is a perspective view of the clutch housing shown in FIG. 13;

FIG. 16 is a front perspective view of a hub utilized in the clutch housing shown in FIG. 13;

FIG. 17 is a rear perspective view of the hub shown in FIG. 16;

FIG. 18 is a front view of the hub shown in FIG. 16;

FIG. 19 is a sectional view of the hub shown in FIG. 16 taken along lines 19-19 of FIG. 18;

FIG. 20 is an enlargement of a portion that is circled in FIG. 18;

FIG. 21 is a side perspective view of the hub shown in FIG. 16; and

DETAILED DESCRIPTION OF THE PREFERRED EMBODIMENTS

The following description of the preferred embodiment(s) is merely exemplary in nature and is in no way intended to limit the invention, its application, or uses.

Figure 1:
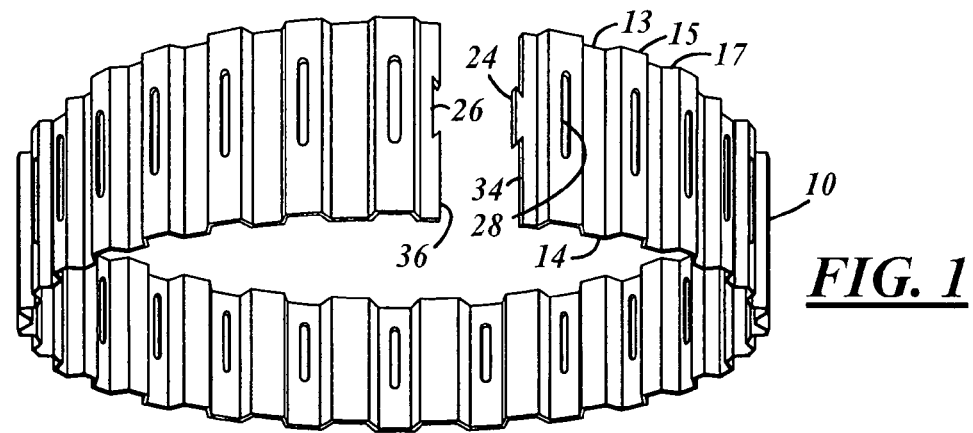
FIG. 1 is a perspective view of a cylindrical body of the clutch housing according to the present invention.
Figure 2:
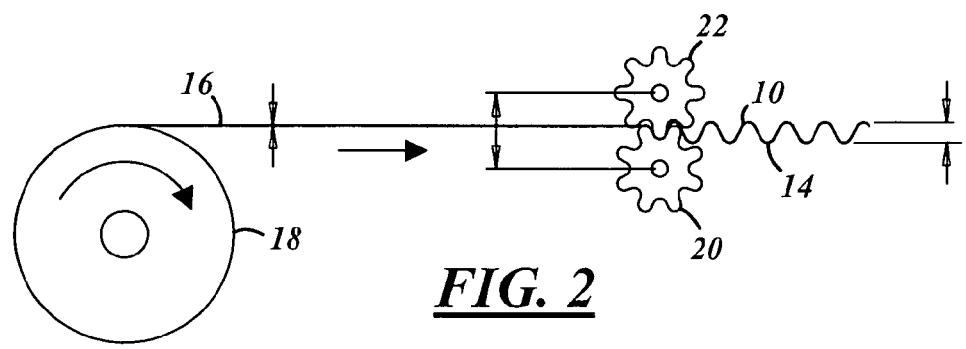
FIG. 2 is a schematic view illustrating a forming operation of the cylindrical body shown in FIG. 1.

Referring to FIG. 1, an unfinished cylindrical body 10 for the clutch housing 7 (FIG. 3) according to the present invention is shown. The cylindrical body 10 is fabricated from a fold formed strip sheet metal work piece. Typical cylindrical body 10 thicknesses can be approximately 1.5 mm. The cylindrical body 10 has a series of spline teeth 14. The spline teeth 14 of the cylindrical body has an inner flat 13 and an outer flat 15 that are joined by slope portions 17. The spline teeth 14, as schematically shown in FIG. 2, can be roll formed from a continuous flat strip 16. The strip 16 is taken off from a bobbin 18. After interacting with a combination of lower and upper rollers 20 and 22 or a series of such rollers, a series of spline teeth 14 are formed on the cylindrical body 10. In a subsequent operation (not shown), an individual cylindrical body is cut off. The cylindrical body 10 also has along its opposite ends, a dove tail interlock joint comprising a male tab 24 and a corresponding female cut out 26. The spline teeth 14 have a series of punched out oil slots 28. The ends of the cylindrical body 34 and 36 are brought together to form the cylindrical shape of the cylindrical body and a connective interlock is formed by the dove tail joint 24, 26 thereafter the ends 34, 36 are joined preferably by welding, clenching or brazing. In another embodiment (not shown) the cylindrical body can be formed as a stamping that is progressively stamped by dies which translate toward one another.

Figure 3:
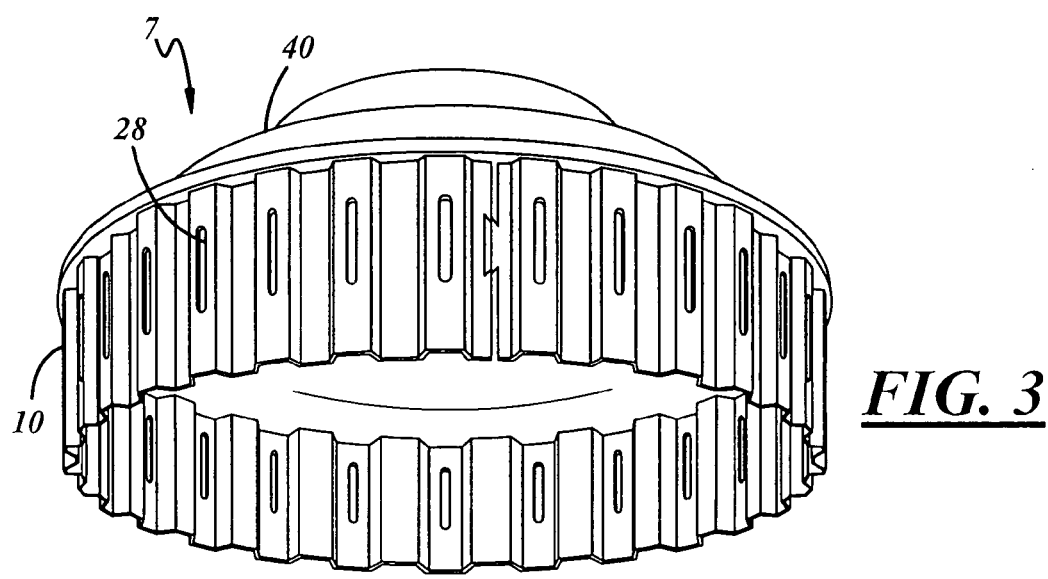
FIG. 3 is a perspective view of a cylindrical body joined to a hub to form a clutch housing according to the present invention.
Figure 4:
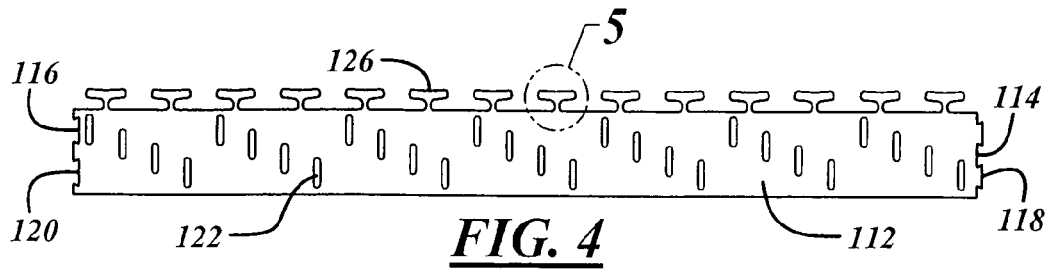
FIG. 4 is a front elevational view of a cylindrical body utilized in an alternate preferred embodiment clutch housing of the present invention.
Figure 5:
FIG. 5 is an enlargement of a portion encircled in FIG. 4.
Figure 6:
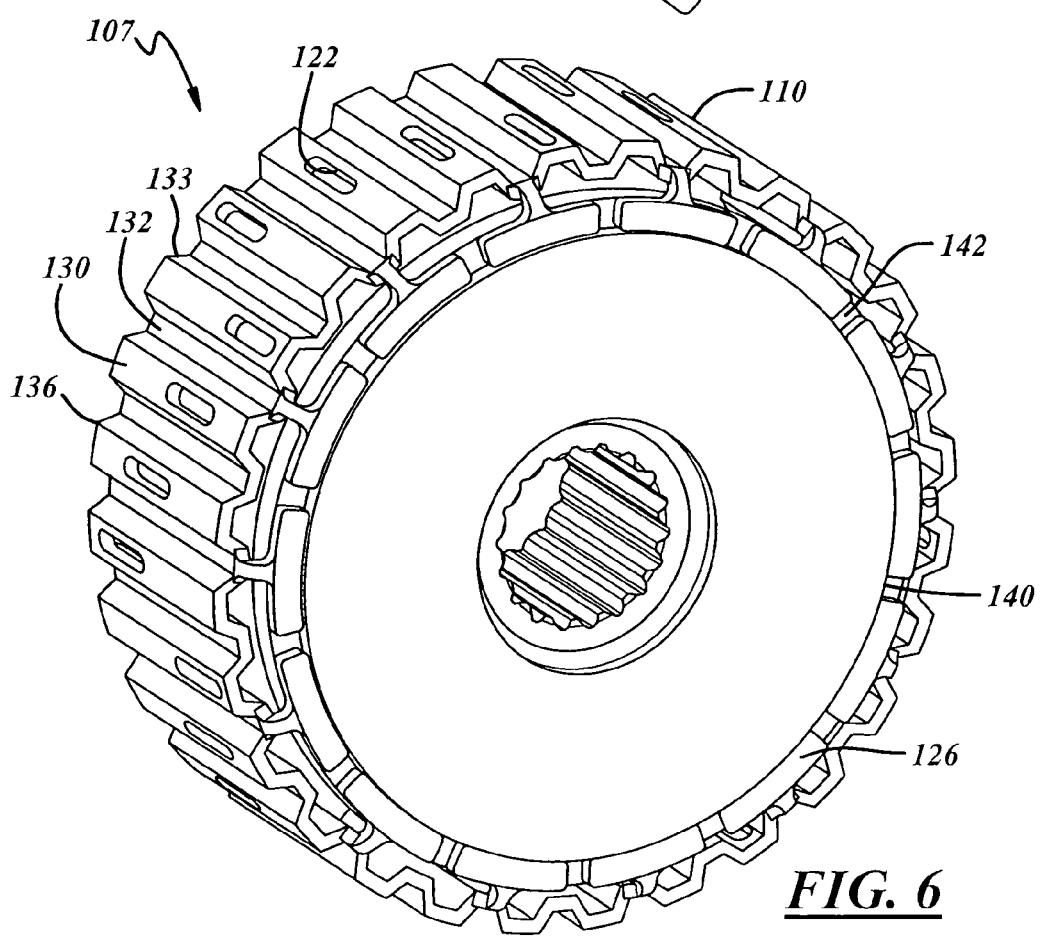
FIG. 6 is a perspective view of a clutch housing utilizing a cylindrical body shown in FIG. 4.
Figure 7:
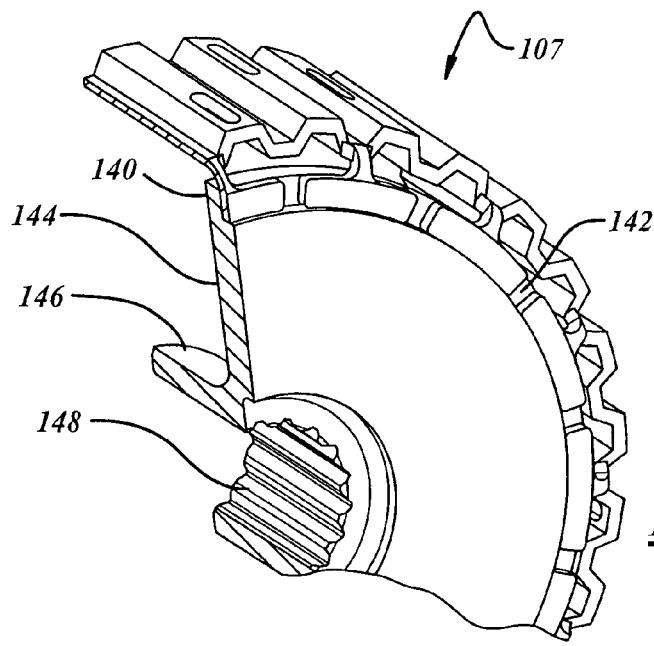
FIG. 7 is a cut away partial sectioned perspective view of the clutch housing shown in FIG. 6.

Referring the FIG. 3, the cylindrical body 10 is permanently connected with a hub 40. The hub 40 along its inner diameter (not shown) has a series of spline teeth to allow the hub to torsionally interact with a shaft. As shown, clutch housing 7 can function with clutch plates within its inner diameter or with clutch plates riding on its outer diameter.

Referring to FIGS. 4, 5, 6 and 7, a clutch housing 107, according to the present invention, is provided. The clutch housing 107 has a cylindrical body 110 that is fabricated from a blank strip 112. The blank strip 112 has along its opposite ends 114 and 116, double male dove tail interlocks 118 and female dove tail inserts 120 respectively. The blank strip 112 also has a series of oil slots 122. The oil slots 122 are axially staggered along a rotational axis of the clutch housing. The blank strip 112 also has stamp formed thereto, integral tab members 126. The tab members 126 are connected to a remainder of the cylindrical body by a neck 128. Clutch housing 107 has a hub 140. The hub 140 has a disc portion 144 that is integrally joined to a tubular or cylindrical portion 146. The disc portion 144 has an annular groove 142. An inner diameter of the cylindrical portion 146 has spline teeth 148 allowing the hub 140 to be connected with or turned by a shaft passing through its inner diameter. The tabs 146 abut the hub 140 and are connected thereto typically by a welding process. Spline teeth 136 have an outer radial flat 130 and an inner radial flat 132 that are joined by slope portions 133. As shown, typically clutch housing 107 has the friction disk or divider plates slidably mounted on its outer diameter.

Figure 8:
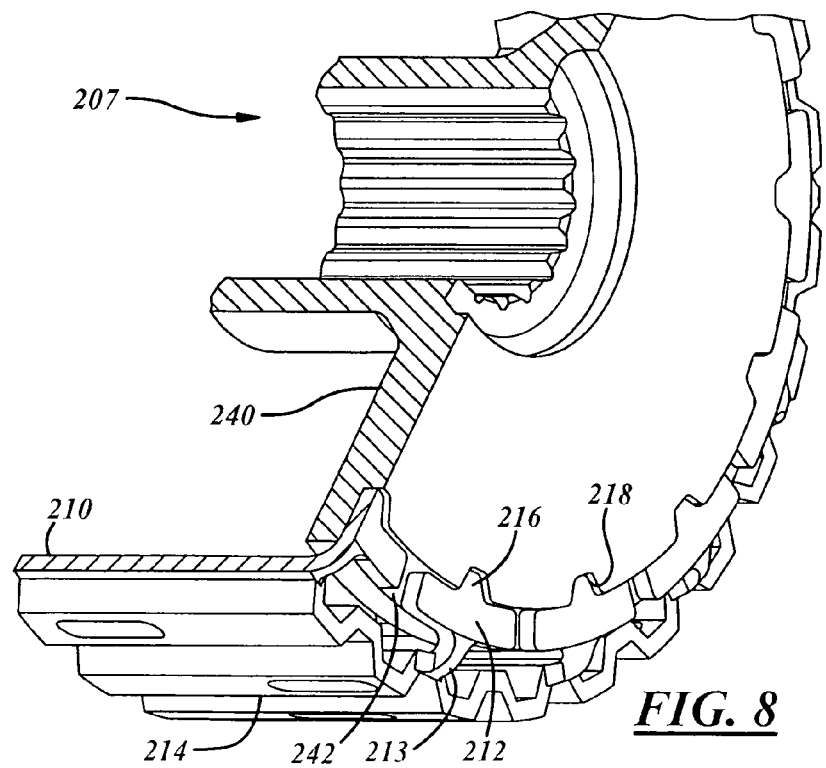
FIG. 8 is a sectional view similar to that of FIG. 7 of another alternate preferred embodiment clutch housing according to the present invention.

Referring to FIG. 8, a clutch housing 207 is provided. Clutch housing 207 has a hub 240 substantially similar to previously described hub 140 for clutch housing 107. However, the hub 240 has an annular groove 242 that additionally has gear tooth shaped radially inward directed depressions 218. The cylindrical body 210 has spline teeth 214 with stem portions 213 connected with radially inwardly bent tabs 212. Tabs 212 have a radially inward projecting portion 216 that is fitted within the gear tooth depression 218 of the hub to provide a gear tooth like circumferential inner lock between the cylindrical portion 210 and the hub 240. Again, the tabs 212 are typically welded to the hub 240.

Figure 10:
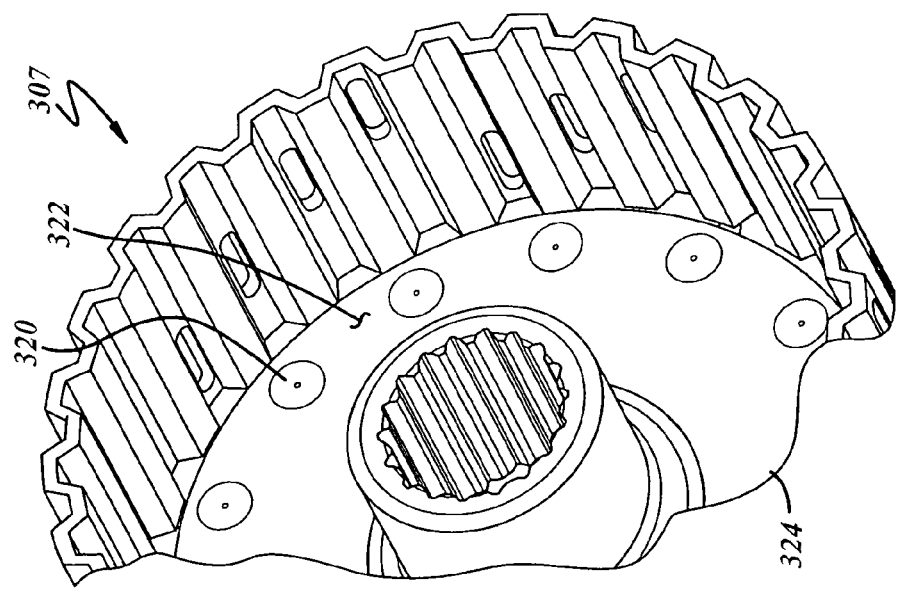
FIG. 10 is a partial perspective view of the clutch housing shown in FIG. 9 from an opposite direction.
Figure 9:
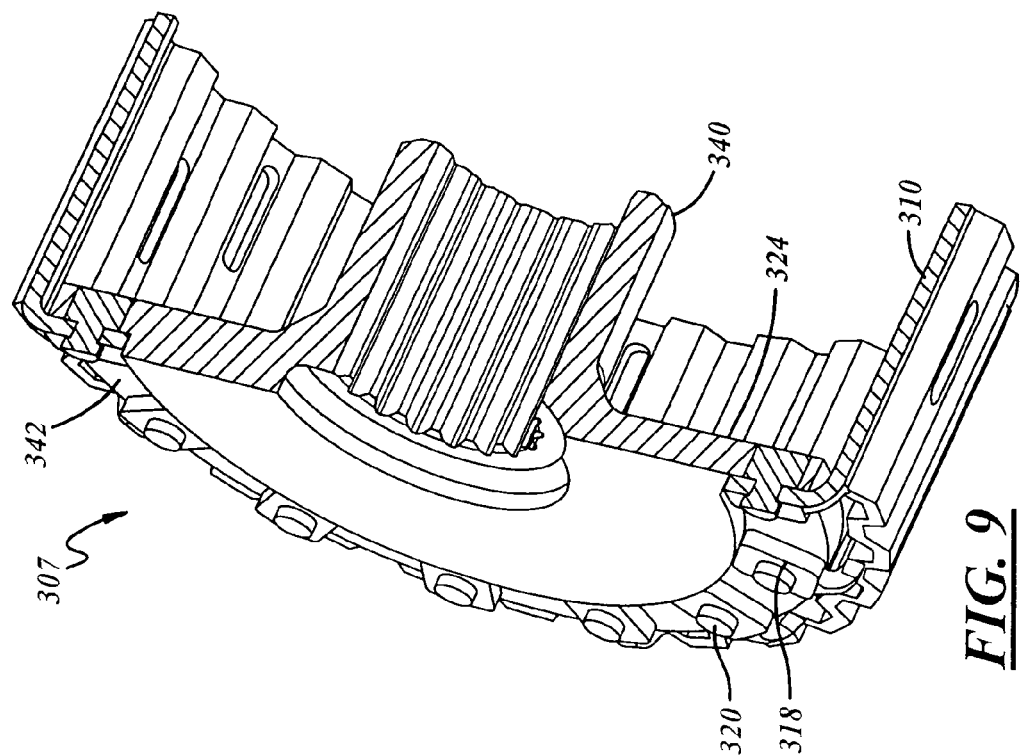
FIG. 9 is a sectional view similar to that of FIG. 8 illustrating yet another alternate preferred embodiment clutch housing according to the present invention.

Referring to FIGS. 9 and 10, a clutch housing 307 is provided. Clutch housing 307 has a hub 340 that is essentially similar to the hub 140 previously described. The hub 340 has a cylindrical groove 342. A cylindrical body 310 has generally rectangular shaped tabs 318 that are connected with the hub 340 by rivets 320. The rivets 320 have a head that is generally flush with the surface 322 of a disc portion 324 of the hub 340.

Figure 11:
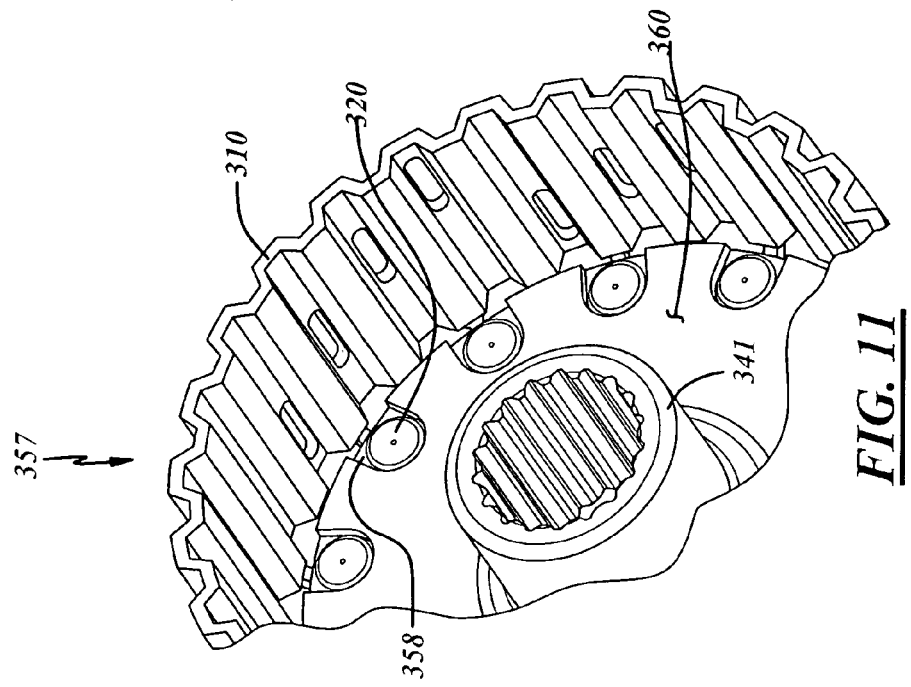
FIG. 11 is a view similar to that of FIG. 10 of yet another alternate preferred embodiment clutch housing according to the present invention.

Referring to FIG. 11, an alternate preferred embodiment 357 of the present invention is provided that is essentially similar to clutch housing 307. However, the hub 341, in its disc portions interior surface 360 adjacent to heads the rivets 320 utilized to connect the cylindrical body 310 to the hub 341 has a slight depression cut out 358. The cut out 358 allows the head of the rivet 320 to be radially enlarged in the attachment operation.

Figure 12:
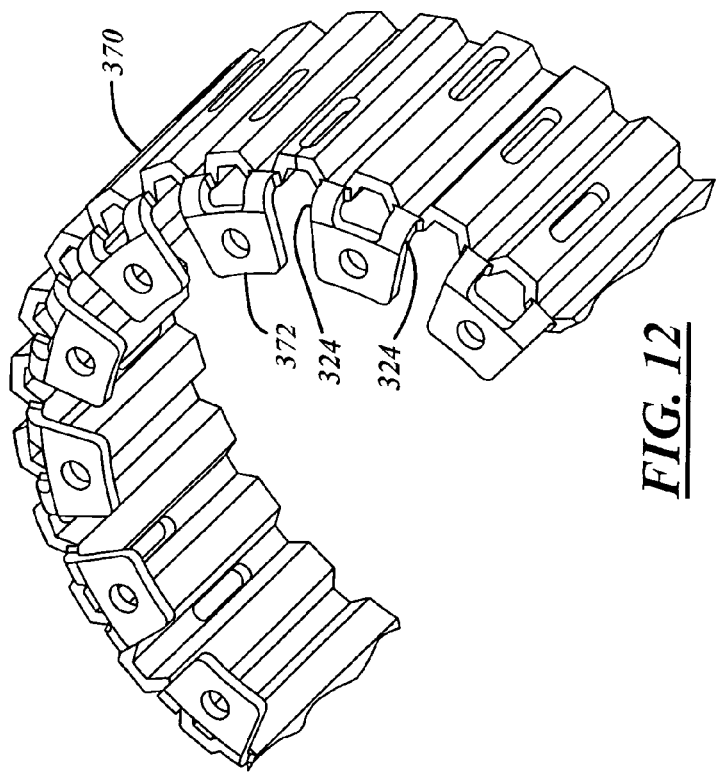
FIG. 12 is a partial perspective view of a cylindrical body which can be utilized as an alternative to the cylindrical body shown in the clutch housings illustrated in FIGS. 9, 10 and 11.
Figure 22:
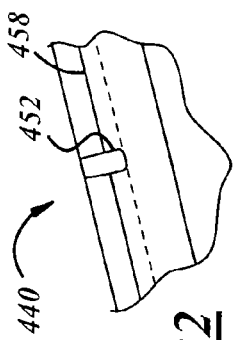
FIG. 22 is an enlargement of a portion 22 encircled in FIG. 21.

Referring to FIG. 12, an alternate preferred embodiment cylindrical body 370 is provided that can be utilized with the hubs 340, 341 shown in FIGS. 9, 10 and 11. Cylindrical body 370 has a series of tabs 372 with compound stems 374 attaching the radial tabs 372 with the remainder of the cylindrical body 370.

Referring to FIGS. 15-22, a clutch housing 407 is provided. Clutch housing 407 has a hub 440. Hub 440 has a disc portion 442 integrally connected with a cylindrical portion 444 having internal spline teeth 446. The hub 440 has a series of apertures 448 to allow for passage of rivet fasteners 450 that connects the hub 440 with a cylindrical body 410. The hub 440 along its peripheral surface has a series of radially projecting gear like teeth 451. Alternating teeth 451 have radial overhangs 452. The radial overhangs 452 are continuous with vanes 454 that are formed by depressions 458 in an outer surface of the hub disc portion 442. Cylindrical body 410 has roll formed spline teeth 414 that have a series of axially alternating positioned oil slots 416. The cylindrical body 410 has a generally axial portion 418 and radially inwardly bent tabs 420. Between the generally cylindrical portion 418 and the radially inwardly bent tabs 420 is a transition region 422. Between the tabs 420 within the transition region 422, there are slots 424. Connecting the generally cylindrical body 410 with the hub 440 are a series of rivets 450. The radial tabs 420 are aligned with the hub depressions 458 and the hub's radial gear like teeth 451 are aligned with an outer radial flat 417 of the spline teeth 414 of the cylindrical body 410. Additionally, the gear teeth 451 aid in supporting the spline teeth 414 in the transition region 422. The webs 454 and their slot 424 received radial overhangs 452 provide for a circumferential interlock and torsional force transfer to the cylindrical body tabs 420. In the transition region 422, the aforementioned interlock inhibits a propagation of cracks in the cylindrical body 410.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A clutch housing comprising:
a hub with a cylindrical portion with a splined inner diameter and a disc portion with gear like teeth along its peripheral edge and said disc portion having radial overhangs; and
a generally cylindrical body formed from sheet strip material with spline teeth fold formed thereon, said cylindrical body spline teeth being aligned and connected with said hub portion gear like teeth, said cylindrical body having tabs bent radially inward to facilitate connection with said hub portion, and said cylindrical body having a transition region between said tabs and a generally axial portion of said cylindrical body with slot therein accepting said hub radial overhangs and having torsional exchange therewith.

2. A clutch housing as described in claim 1 wherein said tabs are fastener connected with a generally planer disc portion of said hub portion.

3. A clutch housing comprising:
a hub with a cylindrical portion with a splined inner diameter and a disc portion with gear like teeth along its out peripheral edge, said disc portion having a planer disc portion with depressions formed therein forming generally radial ribs, said radial ribs having radial overhangs; and
a generally cylindrical body formed from sheet strip material with splined teeth break fold formed thereon, said cylindrical body splined teeth being aligned and connected with said hub portion gear like teeth, said cylindrical body having tabs bent radially to facilitate fastener connection of said depressions with said hub portion and having a generally lateral interference with said ribs of said hub portion, and said cylindrical body having a transition region between said tabs in a generally axial portion of said cylindrical body with a slot therein accepting said hub radial overhangs and having torsional interchange therewith.

* * * * *